Patented July 10, 1934

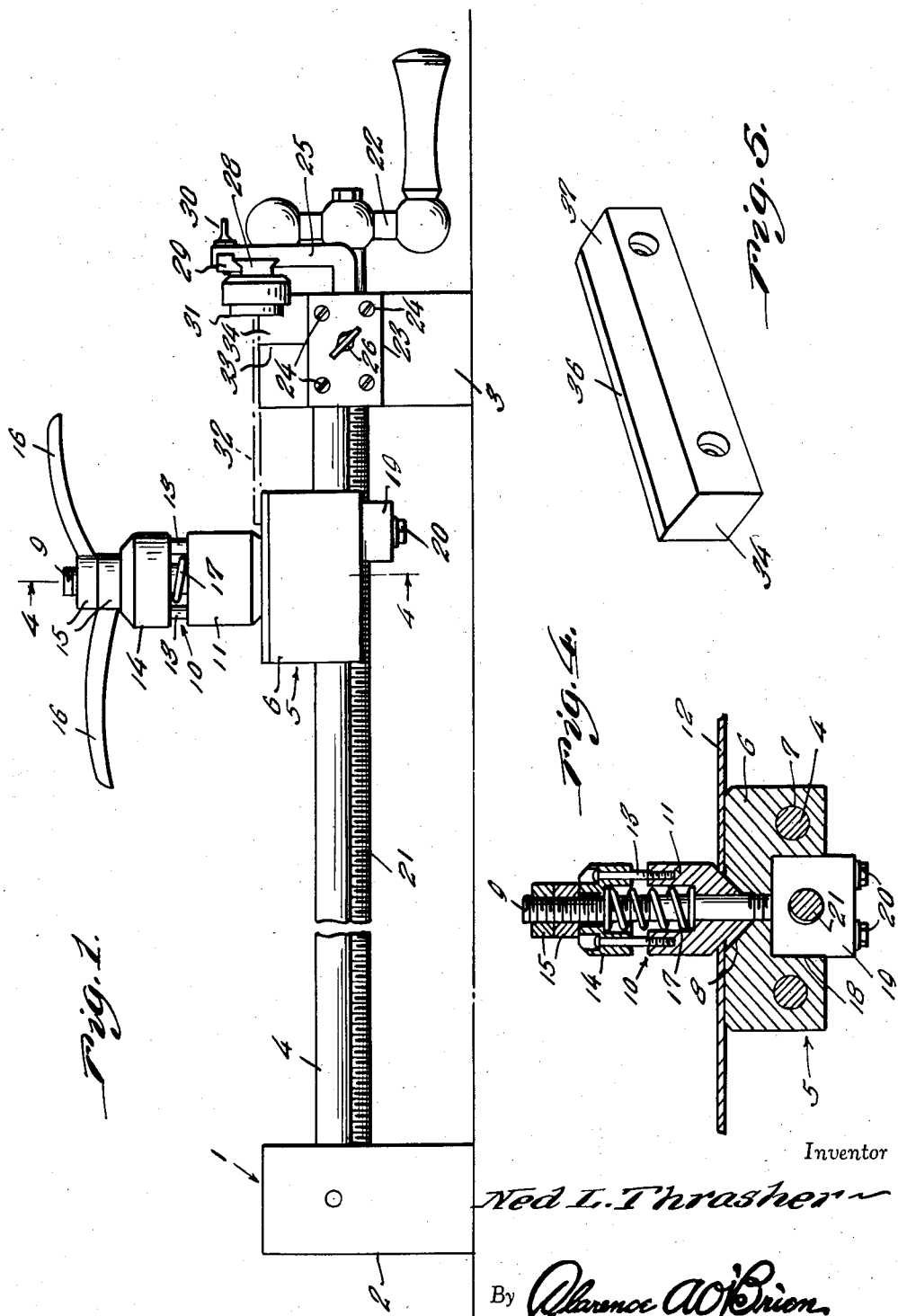

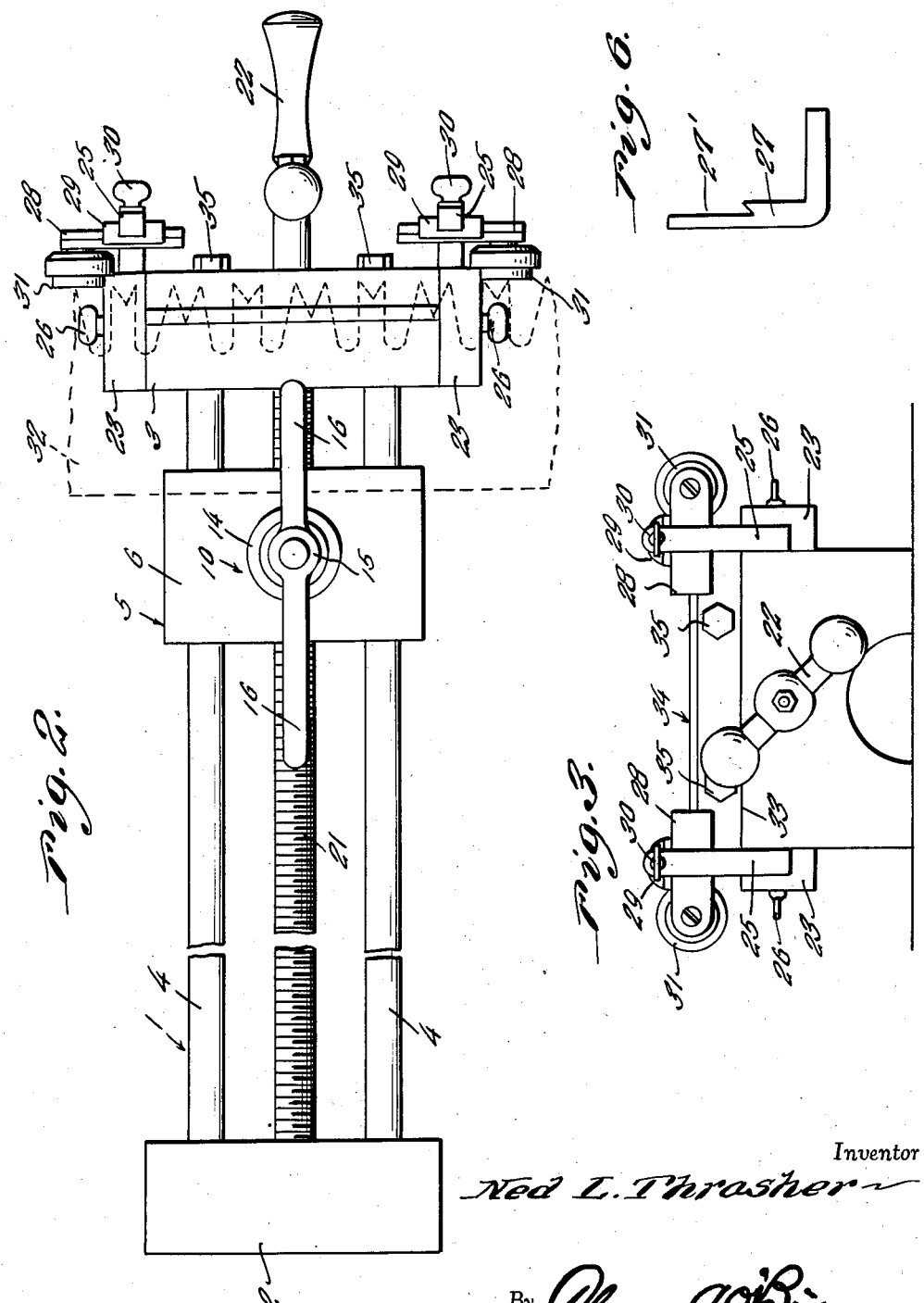

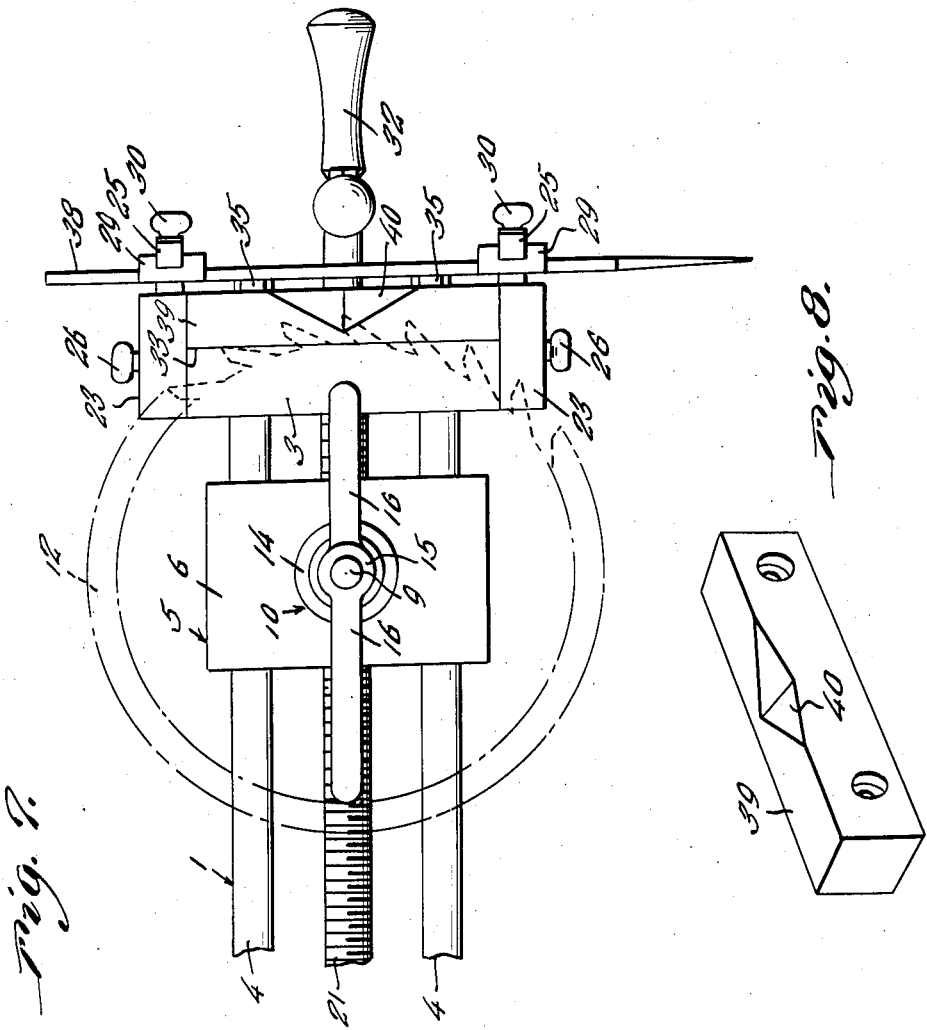

1,966,364

UNITED STATES PATENT OFFICE 1,966,364

SAW SET

Ned L. Thrasher, Perrysburg, N. Y.

Application October 16, 1933, Serial No. 693,867

4 Claims. (Cl. 76—73)

The present invention relates to new and useful improvements in saw sets and has for one of its important objects to provide, in a manner as hereinafter set forth, a device of this character embodying a novel construction, combination and arrangement of parts through the medium of which circular saws may be set and which may be expeditiously converted for use in setting cross cut saws.

Another important object of the invention is to provide an anvil for setting circular saws embodying a construction which is such that the outer end portions only of the teeth will be set with an approximately four degree back and side clearance, thereby preventing side drag, giving a smoother kerf with less waste of material and otherwise improving the operation of the saw.

Another important object of the invention is to provide an adjustable carriage for circular saws, said carriage embodying novel means for centering the saw regardless of its bore while at the same time maintaining an equal tension on said saw at all times while it is being set.

Still another important object of the invention is to provide a novel arrangement and adjustable mounting of gauge disks or members for use in setting cross cut saws whereby the teeth on opposite sides of the tooth to be set may be engaged to facilitate setting the teeth at the same angle at all times.

Other objects of the invention are to provide a saw set of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:

Figure 1 is a view in side elevation of the invention, showing the device assembled for setting cross cut saws.

Figure 2 is a top plan view thereof.

Figure 3 is a view in front elevation.

Figure 4 is a view in vertical section through the circular saw carriage, taken substantially on the line 4—4 of Figure 1.

Figure 5 is a detail view in perspective of the cross cut saw anvil.

Figure 6 is a detail view in side elevation of one of the adjustable gauge or file supporting brackets.

Figure 7 is a top plan view of one end portion of the device, showing the same for use in setting and jointing circular saws.

Figure 8 is a detail view in perspective of the circular saw anvil.

Referring now to the drawings in detail, it will be seen that the reference numeral 1 designates generally a frame, said frame comprising a pair of spaced, opposed, metallic bases 2 and 3 between which a pair of spaced parallel rods 4 extend.

Mounted for sliding adjustment on the rods 4 is a saw carriage or support which is designated generally by the reference numeral 5. As illustrated to advantage in Figure 4 of the drawings, the carriage 5 includes a block 6 having bores 7 therein which slidably accommodate the rods 4. In its top, the block 6 has formed therein a substantially conical socket 8 from which a centrally located threaded post 9 rises, said post 9 being threaded into the block 6.

Slidably mounted on the post 9 is a resilient clamp which is designated generally by the reference numeral 10. The clamp 10 includes a counterbored circular jaw 11 having a substantially conical lower end which is adapted to project through the bore of the circular saw 12 into the socket 8. Threadedly mounted in the top of the jaw 11 and rising therefrom are headed guide pins 13 upon which a counterbored ring 14 is slidable. The upper end portions of the openings in the ring 14 which accommodate the guide pins 13 are enlarged for the reception of the heads of said guide pins. Retaining nuts 15 are threaded on the upper end portion of the post 9 for securing the clamp 10 in engagement with the saw, said nuts including operating levers 16. A coil spring 17 encircles the post 9 and has one end engaged with the ring 14 and its other end engaged with the jaw 11 for yieldingly urging said jaw 11 against the saw 12. It will thus be seen that the circular saw 12 is automatically centered and frictionally secured in position on top of the block 6. It will further be seen that the jaw 11 may be successfully used with saws having bores of any diameter within a given range.

Traversing the bottom of the block 6 is a channel 18 in which a nut 19 is secured, as by bolts 20. Threadedly engaged in the nut 19 is an adjusting screw 21 which is journalled in the bases 2 and 3. The screw 21 extends through the base 3 and has fixed on one end an operating crank 22.

The reference numeral 23 designates guides which are secured on the sides of the base 3 by screws 24. Mounted for longitudinal sliding adjustment in the guides 23 are angular brackets 25 which are secured in adjusted position through the medium of set screws 26. The upper portions of the vertical legs of the angular brackets 25 have formed therein recesses 27 the lower end walls of which are undercut, as best seen in Figure 6 of the drawings. When a cross cut saw is to be set, the recesses 27 are for the reception of substantially dovetailed laterally projecting adjustable arms 28 which are secured in adjusted position by clamps 29 which, in turn, are secured on the brackets 25 by thumb screws 30. Gauges 31 are mounted on the outer end portions of the adjustable arms 28 for engagement by the teeth of the cross cut saw. In Figures 1 and 2 of the drawings, a cross cut saw is shown in broken lines and designated by the reference numeral 32.

The upper portion of the base 3 has formed therein a recess or rabbet 33 for the reception of an anvil 34. The anvil 34 is removably secured in position by bolts 35. The top of the anvil 34 includes a horizontal portion 36 and an inclined portion 37.

When a cross cut saw is to be set, said saw is mounted on top of the base 3 with its back portion resting on the block 6 of the carriage 5 and with the teeth projecting over the inclined face 37 of the anvil 34. The teeth are then struck with a hammer or other suitable instrument in a manner to bend or set said teeth at an angle conforming to the inclined face 37 of the anvil 34, as will be readily understood. The gauge disks 31 may be adjusted to engage the teeth of the saw on both sides of the tooth to be set so that the angle of the set will be the same at all times.

As will also be readily apparent, the gauge disks 31 may be adjusted longitudinally by shifting the angular brackets 25 in the guides 23.

When a circular saw is to be set and jointed, the arms 28 are removed and a file 38 is secured in position on the angular brackets 25 in opposed relation to the periphery of the circular saw. Also, an anvil 39 is substituted for the anvil 34, said anvil 39 having a depression or recess 40 in its upper face which is substantially triangular in plan, as illustrated to advantage in Figures 7 and 8 of the drawings. The depression or recess 40, it will be noted, includes substantially triangular, synclinal face portions, the juncture of said synclinal face portions being inclined and extending from one face of the anvil to a point in spaced relation to an obverse face thereof. The circular saw 12 is secured in position on the block 6 through the medium of the clamp 10 and the carriage 5 is then adjusted so that the outer or free end portions only of the teeth will project over the recess or depression 40 in the manner suggested in Figure 7. Then, the free end portions of the circular saw teeth are set by striking said free end portions with a hammer or other instrument.

It is believed that the many advantages of a saw set and jointer constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

Having thus described my invention, what I claim as new is:

1. A saw set comprising a base, an anvil mounted on the base, guides mounted on the base, angular brackets slidably mounted for adjustment in the guides, means for securing the brackets in adjusted position, laterally extending arms adjustably mounted on the brackets, and gauge disks mounted on the arms and engageable with the teeth of the saw to be set.

2. A saw set comprising a frame, an anvil mounted on the frame, a carriage for the saw slidably mounted on the frame for adjustment toward and away from the anvil, said carriage including a block having a substantially conical socket therein, a post mounted centrally in the socket and rising above the block, a resilient clamp for securing the saw on the block, said clamp including a substantially circular jaw having a substantially conical end portion engageable in the bore of the saw and in the socket, a ring slidably mounted on the post above the jaw, headed guide pins rising from the jaw and slidably engaged in the ring, a coil spring encircling the post between the ring and jaw, a retaining nut threaded on the post and engaged with the ring, and means mounted on the frame and operatively connected with the carriage for adjusting said carriage.

3. An anvil for saw sets including a body having a recess therein, said recess comprising substantially triangular, synclinal faces, the axis formed by said faces being inclined with respect to the plane of the saw.

4. An anvil for saw sets including a body having a recess therein, said recess comprising substantially triangular, synclinal faces, the axis formed by said faces being inclined with respect to the plane of the saw and extending from one face of the body to a point in spaced relation to an opposite face thereof.

NED L. THRASHER.